United States Patent
Reeves et al.

(10) Patent No.: US 9,498,821 B2
(45) Date of Patent: Nov. 22, 2016

(54) MOLTEN METAL-CONTAINING VESSEL AND METHODS OF PRODUCING SAME

(75) Inventors: Eric W. Reeves, Hayden Lake, ID (US); James E. Boorman, Greenacres, WA (US); Richard Scott Bruski, Spokane, WA (US)

(73) Assignee: Novelis Inc., Atlanta, GA (US)

( * ) Notice: Subject to any disclaimer, the term of this patent is extended or adjusted under 35 U.S.C. 154(b) by 1123 days.

(21) Appl. No.: 12/928,356

(22) Filed: Dec. 8, 2010

(65) Prior Publication Data
US 2011/0139797 A1 Jun. 16, 2011

Related U.S. Application Data

(60) Provisional application No. 61/283,906, filed on Dec. 10, 2009.

(51) Int. Cl.
*B22C 9/00* (2006.01)
*B22D 11/103* (2006.01)
(Continued)

(52) U.S. Cl.
CPC ............. *B22D 11/103* (2013.01); *B22D 35/04* (2013.01); *C04B 35/117* (2013.01); *C04B 35/18* (2013.01); *C04B 35/565* (2013.01); *C04B 35/6316* (2013.01); *C04B 35/76* (2013.01); *C21B 7/14* (2013.01); *F27D 3/14* (2013.01); *C04B 2235/3873* (2013.01);
(Continued)

(58) Field of Classification Search
CPC ............. B65D 90/08; B65D 7/12; B65D 7/14; B29C 33/38472; B29C 33/42
USPC .................. 164/529; 220/668; 264/30, 36.2; 266/275, 280, 282; 432/264; 52/454
See application file for complete search history.

(56) References Cited

U.S. PATENT DOCUMENTS 2,301,101 A 11/1942 Welshans
2,693,352 A 11/1954 Bloom
(Continued)

FOREIGN PATENT DOCUMENTS

EP 0 076 577 A1 4/1984
GB 1546540 A 5/1979
(Continued)

OTHER PUBLICATIONS http://www.dansworkshop.com/2008/03/homebuilt-electric-melting-furnace-2/ Dan, Homebuilt Electric Melting Furnace, Mar. 8, 2008.*
(Continued)

*Primary Examiner* — Fenn Mathew
*Assistant Examiner* — Kevin Castillo
(74) *Attorney, Agent, or Firm* — Kilpatrick Townsend & Stockton LLP

(57) ABSTRACT

Exemplary embodiments of the invention provide a vessel for containing or conveying molten metal therein. At least part of the outer surface of the vessel incorporates a web of metal wires embedded in the surface, the wires being mutually overlaid with openings formed therebetween. The refractory material penetrates into the openings. The web may comprise woven metal wires or non-woven wires or both. The web imparts resistance to cracking (or containment of cracks, once formed) and/or resistance to molten metal leakage if cracks develop. The invention also provides metal containment structures containing such vessels, and methods of producing the same.

18 Claims, 4 Drawing Sheets

(51) Int. Cl.
| | |
|---|---|
| B22D 35/04 | (2006.01) |
| F27D 3/14 | (2006.01) |
| C21B 7/14 | (2006.01) |
| C04B 35/117 | (2006.01) |
| C04B 35/18 | (2006.01) |
| C04B 35/565 | (2006.01) |
| C04B 35/63 | (2006.01) |
| C04B 35/76 | (2006.01) |
| C21C 5/52 | (2006.01) |

(52) U.S. Cl.
CPC ............ C04B 2235/5252 (2013.01); C04B 2235/5256 (2013.01); C04B 2235/5264 (2013.01); C04B 2235/6027 (2013.01); C21C 5/5247 (2013.01); Y02P 10/216 (2015.11)

(56) References Cited

U.S. PATENT DOCUMENTS

| | | | |
|---|---|---|---|
| 4,262,885 | A | 4/1981 | Labate |
| 4,389,189 | A | 6/1983 | Harvey et al. |
| 4,504,440 | A | 3/1985 | Sump |
| 4,752,218 | A | 6/1988 | Nos et al. |
| 5,284,328 | A | 2/1994 | Labate et al. |
| 5,318,279 | A * | 6/1994 | Brandy et al. ............... 266/275 |
| 5,505,893 | A | 4/1996 | Connors, Jr. |
| 5,673,902 | A | 10/1997 | Aubrey et al. |
| 5,871,687 | A | 2/1999 | Labate |
| 6,973,955 | B2 | 12/2005 | Tingey et al. |
| 2005/0274013 | A1 | 12/2005 | Aisenbrey |
| 2008/0163999 | A1 | 7/2008 | Hymas et al. |
| 2008/0290568 | A1 | 11/2008 | Bewlay et al. |

FOREIGN PATENT DOCUMENTS

| | | | |
|---|---|---|---|
| GB | 2182128 | A | 5/1987 |
| JP | H10296427 | A | 11/1998 |
| JP | 2008275305 | A | 11/2008 |
| JP | 2008297163 | A | 12/2008 |
| WO | WO 95/21273 | A1 | 8/1995 |
| WO | WO 2006/110974 | A1 | 10/2006 |

OTHER PUBLICATIONS

Sump; Stainless Steel Metal Fiber Reinforcement of Refractories Mar. 1985.*
Canadian Patent Application No. 2,778,438, Office Action mailed Apr. 22, 2014, 4 pages.
Canadian Patent Application No. 2,778,438, Office Action dated Sep. 12, 2013, 3 pages.
U.S. Appl. No. 12/928,353, filed Dec. 8, 2010, Boorman et al.
Japanese Patent Application No. 2012-542323, First Office Action mailed Jan. 6, 2015, 7 pages.
Chinese Patent Application No. CN 201080055819.8, Second Office Action mailed Sep. 4, 2014, 8 pages.
Russian Patent Application No. 2012127005, First Office Action mailed Oct. 23, 2014, 11 pages.
Chinese Patent Application No. 201080055819.8, Fourth Office Action mailed Jul. 31, 2015, 9 pages.
Chinese Patent Application No. 201080055819.8, Third Office Action mailed Mar. 19, 2015, 22 pages.
European Patent Application No. 15168155.8, Extended European Search Report mailed Sep. 7, 2015, 6 pages.
Chinese Patent Application No. CN201080055819.8, "Office Action," Dec. 25, 2013, 13 pages.
Canadian Intellectual Property Office, International Search Report, Mar. 22, 2011, PCT/CA2010/001938 (Novelis Inc. et al.).
Korean Patent Application No. 10-2012-7013068, Office Action mailed Jul. 24, 2016, 15 pages.

* cited by examiner

MOLTEN METAL-CONTAINING VESSEL AND METHODS OF PRODUCING SAME

CROSS-REFERENCE TO RELATED APPLICATION

This application claims the priority right of U.S. provisional patent application Ser. No. 61/283,906 filed on Dec. 10, 2009 by applicants herein. The contents of application Ser. No. 61/283,906 are specifically incorporated herein for all purposes by this reference.

BACKGROUND OF THE INVENTION

I. Field of the Invention

This invention relates to molten metal containment structures including refractory or ceramic vessels used for conveying, treating and/or holding molten metals. More particularly, the invention relates to such vessels and sections thereof.

II. Background Art

Metal containment structures such as launders, runners, etc., are often required during casting operations and the like to convey molten metal from one location, e.g. a metal melting furnace, to another location, e.g. a casting mold or casting table. In other operations, metal containment structures are used for metal treatments, such as metal filtering, metal degassing, metal transportation, or metal holding. Metal-contacting vessels, such as troughs, containers, ladles and the like, used in such structures are generally made from refractory materials, and especially ceramic materials, that are resistant to high temperatures and to degradation by the molten metals to which they are exposed. Sometimes, such structures are provided with sources of heat to ensure that the molten metals do not cool unduly or solidify as they are contained within or conveyed through the vessels. The source of heat may be electrical heating elements positioned adjacent to the vessels or enclosures conveying hot fluids (e.g. combustion gases) along the inner or outer surfaces of the vessels.

Refractory vessels used in such structures are subjected to thermal cycling, i.e. significant changes of temperature, when molten metal is being conveyed or when additional heating is applied, or when the vessel sections are idle or allowed to cool. Thermal cycling can cause cracks to form in the refractory material from which the vessels or vessel sections are made. The cracks propagate with time and may eventually become so large and deep that molten metal leaks from the vessels. When this happens, the vessels thus-affected must be repaired or replaced, and often the service lives of such components are quite short. There is therefore a need for ways of extending the effective service lives of molten metal-contacting vessels and sections thereof, and ways of preventing or minimizing crack formation and leakage of molten metal from such vessels.

U.S. Pat. No. 2,301,101, which issued to Lewis T. Welshans on Nov. 3, 1942, discloses a refractory hot top for a casting mold having wire mesh embedded in its walls, but this there is no disclosure of such use in trough sections.

U.S. Pat. No. 5,505,893, which issued to Charles W. Connors, Jr. on Apr. 9, 1996 discloses an open mesh screen used in molding a refractory lining of a trough. However, the screen is removed or dissolved away after the trough has been completed.

Despite these disclosures, there is still a need for improved vessel sections and improved methods of making the same.

SUMMARY OF THE EXEMPLARY EMBODIMENTS

An exemplary embodiment provides a vessel for contacting molten metal, the vessel comprising a body of refractory material having a cavity for containing or conveying molten metal and an outer surface having a web of metal wires embedded therein. The wires of the web are overlaid with respect to each other with openings formed between the wires into which the refractory material penetrates.

Another exemplary embodiment provides a molten metal containment structure comprising a vessel as defined above, and a metal casing at least partially surrounding the vessel.

According to yet another exemplary embodiment, a method of making a reinforced refractory vessel or vessel section is provided. The method involves providing a mold having the intended shape of the vessel or vessel section, creating a slurry of refractory material capable of forming a cast refractory body, lining at least one internal surface of the mold with a web of metal wires, the wires being overlaid with openings formed therebetween, introducing the slurry into the mold while causing the slurry to penetrate the openings, allowing the slurry to set to form a vessel or vessel section incorporating the web at an outer surface thereof, and removing the vessel or vessel section from the mold. The mold may be vibrated and/or pressurized before the slurry sets or hardens to facilitate penetration of slurry into the openings of the web.

Yet another exemplary embodiment provides an alternative method of making a reinforced refractory vessel. The alternative method involves providing a vessel made of a refractory material and having an external surface, and adhering a web to the external surface, wherein the web comprises metal wires having openings therebetween, and wherein the web is adhered to the external surface by means of a refractory adhesive that is infiltrated into the web through the openings.

Preferably, the vessel is shaped and dimensioned for use as an article selected from the following: an elongated metal-conveying trough having a channel formed therein, a container for a molten metal filter, a container for a molten metal degasser, a crucible, and the like.

The vessel of the exemplary embodiments is made of a refractory material. The term "refractory material" as used herein to refer to metal containment vessels is intended to include all materials that are relatively resistant to attack by molten metals and that are capable of retaining their strength at the high temperatures contemplated for the vessels during normal use, e.g. the temperatures of molten metals. Such materials include, but are not limited to, ceramic materials (inorganic non-metallic solids and heat-resistant glasses) and non-metals. A non-limiting list of suitable materials includes the following: the oxides of aluminum (alumina), silicon (silica, particularly fused silica), magnesium (magnesia), calcium (lime), zirconium (zirconia), boron (boron oxide); metal carbides, borides, nitrides, silicides, such as silicon carbide, nitride-bonded silicon carbide ($SiC/Si_3N_4$), boron carbide, boron nitride; aluminosilicates, e.g. calcium aluminum silicate; composite materials (e.g. composites of oxides and non-oxides); glasses, including machinable glasses; mineral wools of fibers or mixtures thereof; carbon or graphite; and the like.

The vessel of the exemplary embodiments is normally intended for containing molten aluminum and aluminum alloys, but may be used for containing other molten metals, particularly those having similar melting points to aluminum, e.g. magnesium, lead, tin and zinc (which have lower melting points than aluminum) and copper and gold (that have higher melting points than aluminum). Preferably, for use with a particular molten metal intended to be contained or conveyed, the metal chosen for the wires of the metal web should be unreactive with that particular molten metal, or at least sufficiently unreactive that limited contact with the molten metal does not cause excessive erosion, dissolution or absorption of the mesh. Titanium is a good choice for use with molten aluminum and aluminum alloys, but has the disadvantage of high cost. Less expensive alternatives include, but are not limited to, Ni—Cr alloys (e.g. Inconel®) and stainless steel.

The vessel may form part of a metal containment structure having an outer metal casing, and the structure may be provided with a heater for the molten metal. Heated structures of this kind are disclosed in U.S. Pat. No. 6,973,955 issued to Tingey et al. on Dec. 13, 2005, or pending U.S. patent application Ser. No. 12/002,989, published on Jul. 10, 2008 under publication no. US 2008/0163999 to Hymas et al. (the disclosures of which patent and patent application are specifically incorporated herein by this reference).

BRIEF DESCRIPTION OF THE DRAWINGS

Exemplary embodiments are described in the following with reference to the accompanying drawings, in which.

DETAILED DESCRIPTION OF THE EXEMPLARY EMBODIMENTS

Figure 1:
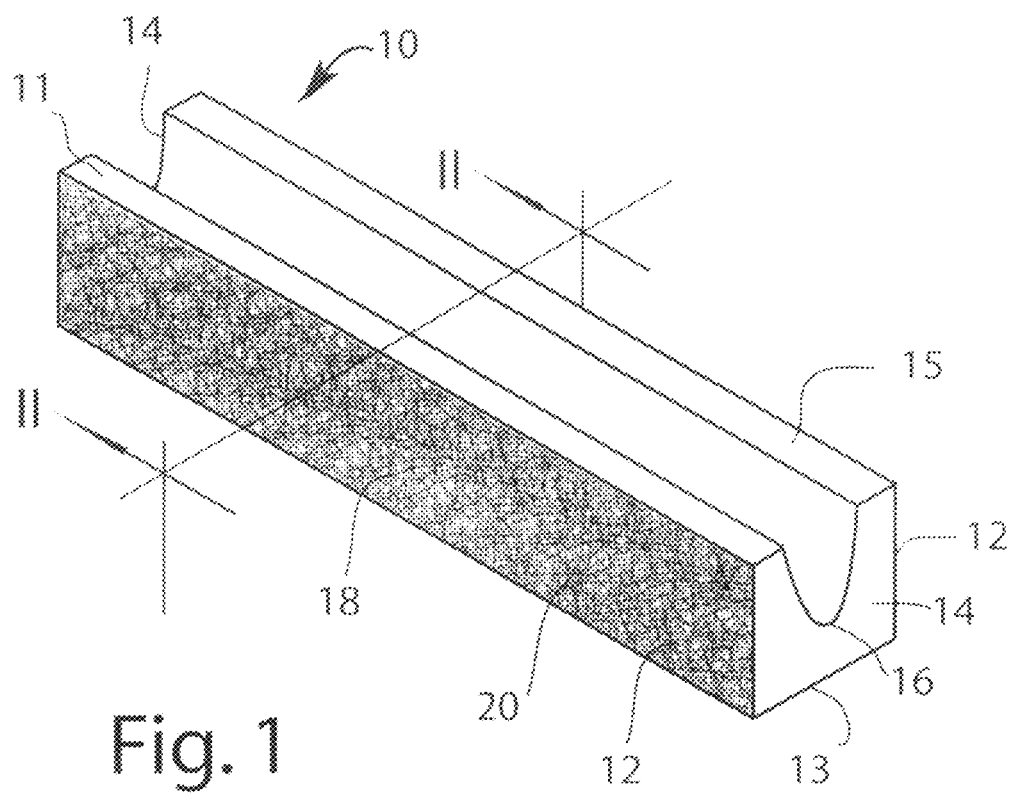
FIG. 1 is a perspective view of a trough section according to one exemplary embodiment.
Figure 2:
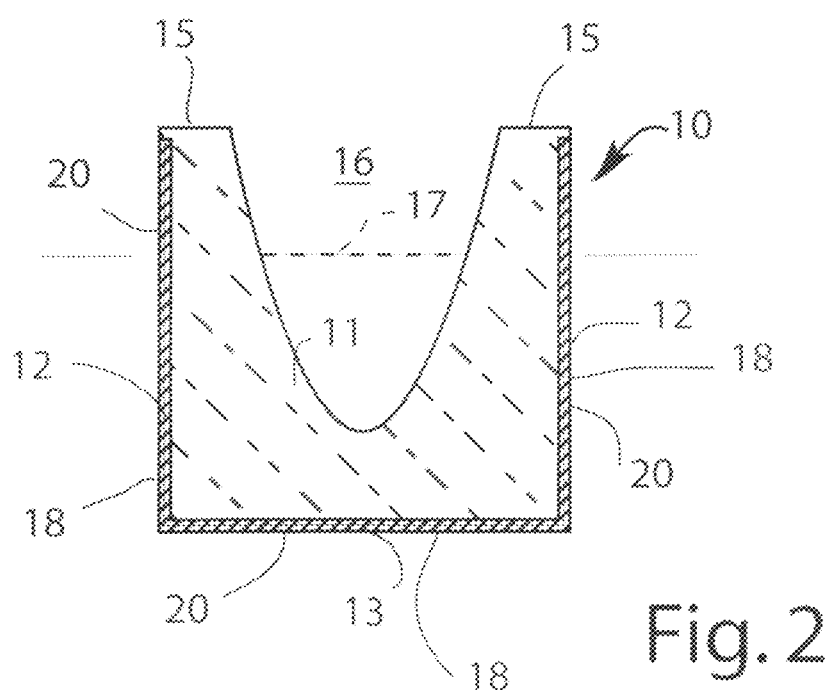
FIG. 2 is a lateral cross-section of the trough section of FIG. 1 taken on the line II-II of FIG. 1.

FIGS. 1 and 2 show a metal containment vessel in the form of a metal conveying trough or trough section 10 according to one exemplary embodiment. The vessel will be referred to below as a trough section because metal conveying troughs usually consist of two or more such sections laid end-to-end, although a functional trough may consist of just one such section. Normally, the trough section(s) would be held within an outer metal casing of a molten metal containment structure (an embodiment of which is described later in connection with FIG. 8) to provide physical protection for the trough section(s) and to keep the trough sections mutually aligned when there is more than one. Heating means (not shown) may also be provided to help keep the molten metal at a suitable temperature as it is conveyed through the trough section(s).

The illustrated trough section 10 has a body 11 made of a refractory material that is resistant to high temperatures and to attack by the molten metal to be conveyed through the trough section. Examples of particularly preferred materials that may be used for the body 11 include ceramics such as alumina, silicon carbide (e.g. nitride-bonded silicon carbide), aluminosilicates, fused silica, or combinations of these materials. Of course, other refractory materials, e.g. any of those mentioned earlier, may be used for the body. The body 11 has an outer surface 18 extending over opposed side walls 12, a bottom wall 13, opposed longitudinal ends 14 and an upper wall 15. An elongated U-shaped metal-conveying channel 16 projects downwardly into the body 11 from the upper wall 15 and extends from one longitudinal end 14 of the body to the other. As illustrated in FIG. 2, the trough section, in use, contains molten metal up to a depth represented by a horizontal level 17, shown as a dotted line, and conveys the molten metal from one end of the trough section to the other. The level 17 represents a height above which an upper surface of molten metal conveyed through the trough section does not rise during normal use of the trough section.

Figure 3:
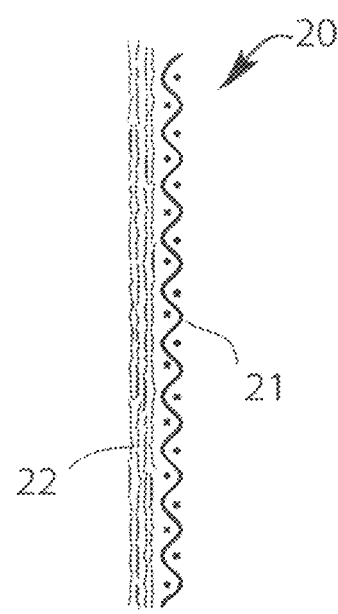
FIG. 3 is a side view of a reinforcing web used in the trough section of FIGS. 1 and 2.
Figure 4:
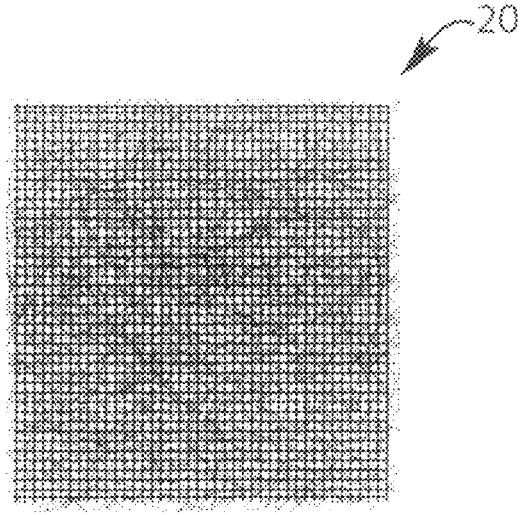
FIG. 4 is plan view of the reinforcing web of FIG. 3.
Figure 5:
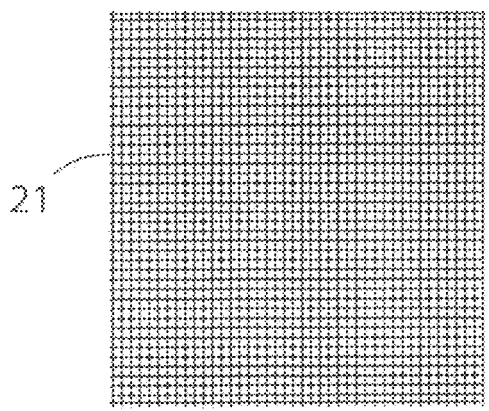
FIG. 5 is a plan view of a woven layer forming part of the reinforcing web of FIGS. 3 and 4.
Figure 6:
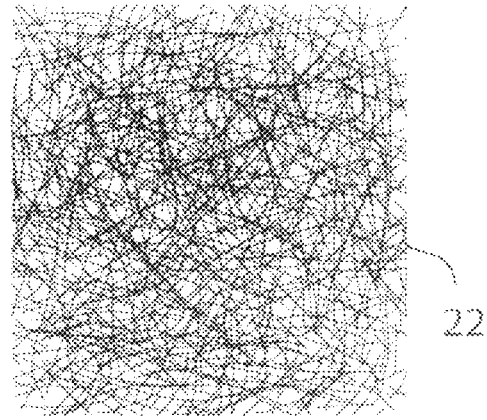
FIG. 6 is a plan view of a non-woven layer forming another part of the reinforcing web of FIGS. 3 and 4.

The side walls 12 and bottom wall 13 are shown as planar but may, if desired, have a contoured shape and/or, in the case of the side walls, a degree of slope relative to the vertical. These walls are provided with a web 20 of metal wires embedded in the outer surfaces thereof. This web is shown in more detail in FIGS. 3 to 6 of the accompanying drawings in isolation from the refractory material of the body 11. It will be seen from the side view of FIG. 3 that the web 20 of this exemplary embodiment is made up of two distinct sections, i.e. a woven metal matrix 21 and non-woven matted (felt-like) metal matrix 22. These two sections are firmly attached together (e.g. by sintering or welding) so they act as a single unified porous web 20. The woven matrix 21 (shown in isolation in FIG. 5) is formed of spaced-apart warp fibers and spaced-apart weft fibers interwoven together to leave openings between the fibers preferably having an average size (width on each side or diameter) in the range of 0.5 to 10 mm, more preferably 1 to 10 mm, and even more preferably 1 to 5 mm. If the openings are made too small, some refractory materials may not penetrate into the openings fully and the woven layer 21 may undesirably create a broad shear plane against which the refractory material may be free to move. If the opening size is much greater than about 10 mm, there may not be enough wire density in some embodiments to effectively hold the refractory in place. It should be noted, however, that openings having widths outside the stated ranges may be effective for some refractory materials, and for some metals used for the wires, so simple testing may be employed to establish the optimum size range for any particular refractory material used for the body 11 of the trough section. The refractory material penetrates the openings of the woven matrix to form a unitary structure with the metal web 20. This provides the trough section with an effective reinforcement to prevent cracks from forming or to limit the propagation or widening of cracks once formed in the trough. A single layer of the woven matrix 21 is preferred, as shown, but a plurality of woven layers may alternatively be used, particularly if such layers are firmly attached together, e.g. by sintering or welding. An example of a suitable woven matrix for one particular embodiment is a #2 wire screen which has openings of about 7 mm in width and wires of about 14 mm in diameter. The woven matrix may be used alone, but preferably it is employed in combination with a non-woven matrix 22 as described below.

The non-woven matrix 22 (shown in isolation in FIG. 6) consists of wire strands laid over each other in a random fashion with openings formed between the strands. The openings between the strands may be similar in size to those between the wires of the woven matrix, but are preferably smaller. The openings preferably range in size from about 50 μm to 10 mm, but more preferred maximum sizes are 5 mm, 1 mm, 500 μm, 450 μm, 400 μm, 350 μm, 300 μm, 250 μm, 200 μm and 150 μm. Most preferably, the average opening size is in the range of 50 to 150 μm, and generally around 100 μm (±25%), although smaller and larger opening sizes may be effective in particular embodiments. The opening size of the non-woven matrix 22 is preferably large enough to allow effective penetration by the refractory material used to form the body of the trough section, but preferably small enough that molten metal will not easily penetrate through the matrix should a crack develop in the adjacent trough section. The non-woven matrix 22 is preferably made up of many metal wires overlying each other and compressed together to form a relatively thick layer so that, should molten metal begin to penetrate this layer, it must follow a tortuous or convoluted path to penetrate completely through the metal matrix, which again makes full penetration unlikely. In some embodiments, the non-woven matrix 22 may be used alone to provide resistance to metal penetration should a crack develop in the trough section, but it is preferably used in combination with the woven matrix 21 as shown and described above, so that a combination of strengthening and resistance to metal penetration can be obtained. When the opening size of the woven matrix is larger than the opening size of the non-woven matrix, a combination of good reinforcement and resistance to metal penetration may be obtained. While the woven matrix is generally preferred for reinforcement and the non-woven matrix is preferred for imparting resistance to metal penetration, these roles may be reversed, if desired, by providing the non-woven matrix with larger openings than the woven matrix.

One section, and preferably both sections, of the web 20 are preferably made of a metal that is resistant to attack by, and not easily wetted by, the molten metal to be conveyed through the trough. This makes it less likely that molten metal will penetrate the metal web should a crack develop. Suitable metals include, but are not limited to, titanium, Ni—Cr alloys (e.g. Inconel®), stainless steel, titanium and other metals or alloys not easily dissolved by the molten metal being conveyed. However, for the web 20, it has been found most advantageous to use a two layer material sold under the trade name G-mat® by Micron Fiber-Tech of 230 Springview Commerce Dr., Suite 100, Debary, Fla. 32713, USA. This product has a structure as shown in FIGS. 3 to 6 and can withstand high heat and is made of a special Fe—Cr—Al-M alloy (where M represents a proprietary ingredient).

The metals used for the wires of each web matrix 21 and 22 are normally the same, but different metals may be used, if desired, e.g. to provide one matrix with more resistance to metal penetration and the other with more strength for reinforcement of the refractory material.

The thickness of the wires used for the different matrices 21 and 22 may be the same but they preferably differ, with thicker wires being used for the woven matrix 21 (for greater strength) and thinner wires used for the non-woven matrix 22 (to provide a more convoluted path for penetrating molten metal). Examples of wire thicknesses are 0.0002 to 0.0003 inch for the non-woven matrix 22 and 0.006 to 0.007 inch (diameter) for the wires of the woven matrix 21. However, these thicknesses are just examples and should not be considered essential for proper effectiveness of the resulting metal webs.

If the trough section is to be used in a heated molten metal distribution structure, the web 20 should preferably have a high thermal conductivity to allow penetration of the heat. However, almost any suitable metal for the web would have a suitable thermal conductivity to facilitate the transfer of heat from the heating means to the molten metal within the channel of the trough section.

Figure 7:
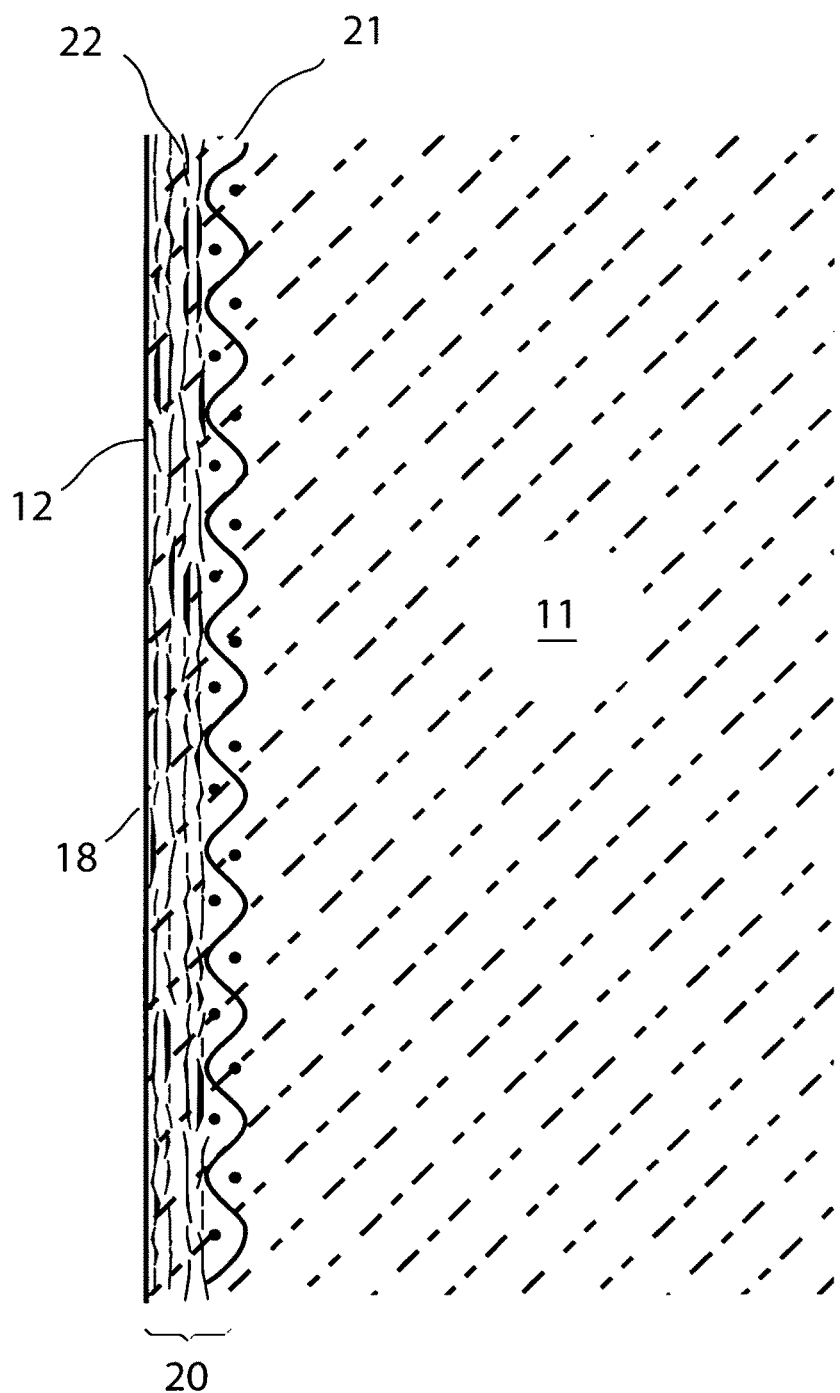
FIG. 7 is an enlarged cross-section of part of a metal-conveying trough section close to a sidewall thereof showing the position of a reinforcing web according to FIGS. 3 to 6.

FIG. 7 is an enlarged cross-section of a part of a trough section of the same embodiment showing the structure of the body 11 adjacent to the outer side surface 18 at side wall 12. It will be seen that the refractory material of the body 11 has penetrated through both the web sections and forms a part of the outer wall 12 of the trough section. In this embodiment, the non-woven matrix 22 is positioned closest to the outside surface 18 and the woven matrix 21 is buried more deeply in the refractory material of the body 11. The non-woven matrix 22 resists penetration of molten metal to the outer surface 18 of the trough section should a crack develop, and the woven-matrix 21 provides structural reinforcement and makes the formation and widening of such a crack less likely. Some of the wires of the non-woven matrix 22 may be visible on the outer surface 18 but the section preferably has refractory material of the trough body 11 embedded therein. While it is preferred to locate the woven matrix 21 further away from the surface 18 than the non-woven matrix 22, as shown, this arrangement may be reversed if desired, i.e. the woven matrix 21 may be positioned closer to the surface 18 than the non-woven matrix 22.

It is preferable to locate the web 20 exactly at (immediately beneath) the outer surface 18 of refractory material, as shown. A deeper position within the body 11 of refractory material would cause the web 20 to divide the wall of the body 11 into two unreinforced (refractory-only) zones on each side of the web, which could reduce the strength and crack-resistance of the wall. It is therefore considered better to position the web exactly at the surface and to keep the refractory-only parts of the walls of the trough section as thick as possible. Furthermore, burying the web 20 more deeply creates two possible shear planes along which the refractory may separate from the web, instead of just one in the embodiment as illustrated.

The web 20 is preferably incorporated into all parts of the outer surface 18 of the trough section below the horizontal level 17 (see FIG. 2) corresponding to the maximum intended surface height of the metal within the channel 16, but is more preferably incorporated into all parts of the sidewalls 12 and the bottom wall 13, as shown. Cracks tend to form in the trough section at the top, so reinforcement adjacent the top is desirable. There is generally no need, however, to incorporate the matrix into the top wall 15 of the trough section.

Trough sections of the kind described above come in various sizes. One example has a length of 665 mm, a width of 204 mm and a height of 365 mm. Any size of trough section can be provided with an embedded web 20 according to exemplary embodiments of the present invention.

Figure 8:
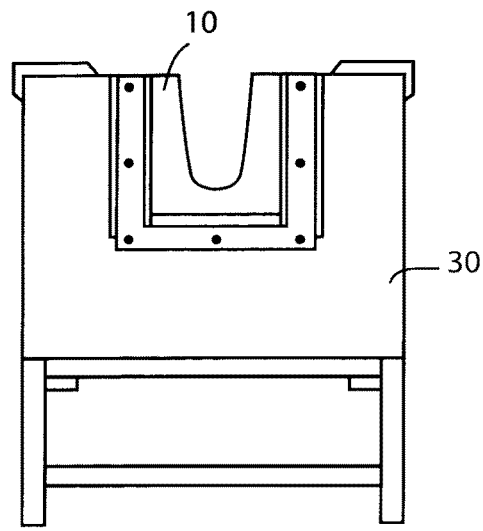
FIG. 8 is an end view of a metal containment structure for conveying molten metals incorporating a trough section as shown in FIGS. 1 and 2.

As mentioned earlier, the trough section 10, which is an example of a vessel for containing or conveying molten metal, may be included in a metal containment structure such as a metal-conveying launder, e.g. as shown in FIG. 8.

In this exemplary embodiment, the trough section 10 is held within a metal casing 30 for support and protection. The interior of the casing may be provided with heating means (not shown) and/or thermal insulation.

Figure 9:
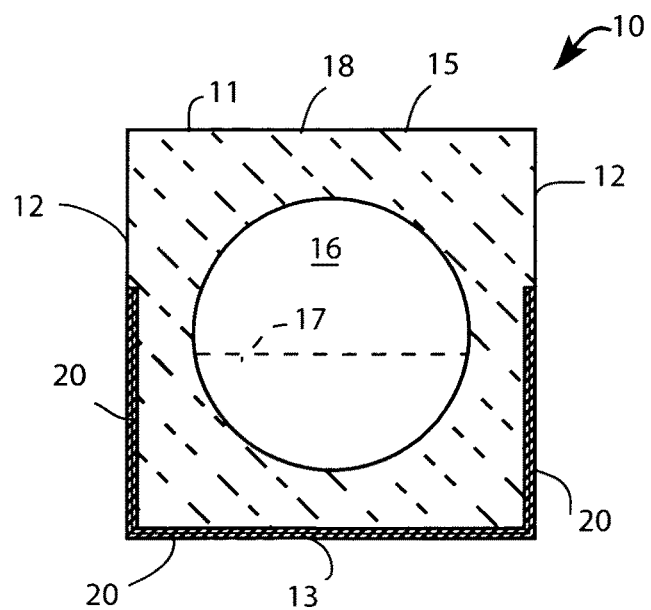
FIG. 9 is a vertical transverse cross-section of a trough section similar to that of FIG. 2, but showing a further exemplary embodiment.

FIG. 9 shows another embodiment of the vessel in which a trough section 10 has a completely enclosed channel 16 extending from one longitudinal end to the other. The channel may be tubular (circular in cross-section) as shown, but may alternatively be of any cross-sectional shape, e.g. oval, asymmetrically round or polygonal. The web 20 extends along the bottom wall 13 of the trough and to a height at the sidewalls 12 that is above horizontal level 17, i.e. the predicted maximum height of the molten metal conveyed through the channel. However, the web 20 may extend all around the outer surface 18 of the trough section, if desired.

Trough sections of the above kinds and other refractory vessels and parts thereof having embedded metal webs may be made by casting a slurry of refractory particles in a mold of desired shape having a layer of the metal web 20 held against one or more sides of the mold that will form sidewalls or the bottom wall surfaces. The slurry may formed from a liquid (e.g. water or colloidal silica) and a refractory mix (ranging from fine powder to larger particulate). The slurry is preferably formulated to provide optimal mold filling and penetration into the openings of the web 20, as well as having a short drying time. The slurry penetrates the metal web before it sets to form the solid body of the trough section. Desirably, the mold is vibrated and/or pressurized (e.g. by introducing the slurry under pressure) as the slurry is introduced and before the slurry sets in order to facilitate the penetration of the slurry into and through the layers of the metal reinforcement. The trough section is then removed from the mold, dried and normally fired to form a tough refractory solid body with the web 20 of metal wires still in place and embedded in the refractory surfaces.

An alternative method of formation involves adhering the web 20 with a refractory adhesive to an outer surface of a pre-formed vessel or vessel section made entirely of refractory material. The refractory adhesive penetrates the web of metal wires and, once solidified, has the same structure at the surface as the embodiments discussed above. However, there may be an increased likelihood that the web will become detached from the remainder of the refractory material during crack formation or upon thermal cycling so this method is less preferred than the one discussed above, but remains a useful way of modifying pre-formed trough sections to improve their properties, such as resistance to metal leakage.

In the above embodiments, the vessel has been shown as an elongated molten metal trough or trough section of the kind used in molten metal distribution systems used for conveying molten metal from one location (e.g. a metal melting furnace) to another location (e.g. a casting mold or casting table). However, according to other exemplary embodiments, other kinds of metal containment and distribution vessels may employed, e.g. those designed as an in-line ceramic filter (e.g. a ceramic foam filter) used for filtering particulates out of a molten metal stream as it passes, for example, from a metal melting furnace to a casting table. In such a case, the vessel includes a channel for conveying molten metal with a filter positioned in the channel. Examples of such vessels and molten metal containment systems are disclosed in U.S. Pat. No. 5,673,902 which issued to Aubrey et al. on Oct. 7, 1997, and PCT publication no. WO 2006/110974 A1 published on Oct. 26, 2006. The disclosures of the aforesaid U.S. patent and PCT publication are specifically incorporated herein by this reference.

In another exemplary embodiment, the vessel acts as a container in which molten metal is degassed, e.g. as in a so-called "Alcan compact metal degasser" as disclosed in PCT patent publication WO 95/21273 published on Aug. 10, 1995 (the disclosure of which is incorporated herein by reference). The degassing operation removes hydrogen and other impurities from a molten metal stream as it travels from a furnace to a casting table. Such a vessel includes an internal volume for molten metal containment into which rotatable degasser impellers project from above. The vessel may be used for batch processing, or it may be part of a metal distribution system attached to metal conveying vessels. In general, the vessel may be any refractory metal containment vessel positioned within a metal casing. The vessel may also be designed as a refractory ceramic crucible for containing large bodies of molten metal for transport from one location to another. All such alternative vessels may be used with the exemplary embodiments of the invention.

EXAMPLES

Tests were carried out on a test piece of refractory material having G-mat® web incorporated into the surface. The test piece was subjected to thermal cycling to determine if it would delaminate, and was then subjected to destructive testing to see if the web would hold a cracked piece of refractory together. The results showed that the test piece did not delaminate and the cracked piece did indeed hold together.

The invention claimed is:

1. A vessel for molten metal, the vessel comprising a body of refractory material having a cavity for containing or conveying molten metal, and an outer surface having a web of metal wires embedded therein, said wires being overlaid with respect to each other with openings formed between said wires into which openings said refractory material penetrates, wherein the web of metal wires comprises at least two overlying web sections, one of the web sections comprising a woven matrix of metal wires for providing structural reinforcement to the refractory material and another of the web sections comprising a non-woven matrix of metal wires including a plurality of metal wires overlying one another in a random fashion and matted together to define a plurality of openings having an average width in a range of 50 μm to 350 μm and a plurality of convoluted paths across a thickness of the non-woven matrix for resisting penetration of the molten metal through the non-woven matrix of metal wires.

2. The vessel of claim 1, wherein said body has a horizontal level above which an upper surface of molten metal contained in or conveyed through the cavity does not extend during normal use of the vessel, and wherein said web of metal wires is embedded in at least all parts of said outer surface at and below said horizontal level.

3. The vessel of claim 1, wherein a thickness of the metal wires of the woven matrix is greater than a thickness of the metal wires of the non-woven matrix.

4. The vessel of claim 1, wherein the web section comprising the non-woven matrix is positioned closer to the outer surface than the web section comprising the woven matrix of metal wires.

5. The vessel of claim 1, wherein the at least two overlying web sections are joined to each other.

6. The vessel of claim 1, wherein said non-woven matrix is positioned closer to said outer surface than said woven matrix.

7. The vessel of claim 1, wherein said woven matrix is positioned closer to said outer surface than said non-woven matrix.

8. The vessel of claim 1, wherein the woven matrix of said wires has openings with an average width greater than an average width of openings in the non-woven matrix.

9. The vessel of claim 8, wherein the average width of the openings in the woven matrix is in the range of 0.5 to 10 mm.

10. The vessel of claim 8, wherein the average width of the openings in the woven matrix is in a range of 1 to 10 mm.

11. The vessel of claim 8, wherein the average width of the openings in the non-woven matrix is in a range of 50 µm to 150 µm.

12. The vessel of claim 8, wherein the average width of the openings in the non-woven matrix is about 100 µm.

13. The vessel of claim 1, wherein said metal wires are made from a metal which resists attack by molten metal conveyed by the trough section.

14. The vessel of claim 1, wherein said metal wires are made from a metal selected from the group consisting of stainless steel, titanium, Ni—Cr based alloys and Fe—Cr—Al based alloys.

15. The vessel of claim 1, wherein the vessel is an elongated trough or trough section with said cavity forming a channel extending from one longitudinal end of said body to another end thereof.

16. The vessel of claim 15, wherein said body has an upper surface and said channel is open at said upper surface of the body.

17. The vessel of claim 15, wherein the body of the vessel completely encloses the channel except at said longitudinal ends.

18. The vessel of claim 1, wherein said vessel is an article selected from the group consisting of an elongated metal-conveying trough, a container for a molten metal filter, a container for a molten metal degasser, and a crucible.

\* \* \* \* \*